(12) United States Patent
Gardner

(10) Patent No.: US 10,419,240 B2
(45) Date of Patent: *Sep. 17, 2019

(54) METHOD OF BUS VIRTUALIZATION IN COMPUTING MACHINE INTERCOMMUNICATIONS

(71) Applicant: AT&T Intellectual Property I, L.P., Atlanta, GA (US)

(72) Inventor: James A. Gardner, Middletown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,604

(22) Filed: Aug. 24, 2018

(65) Prior Publication Data

US 2018/0367336 A1    Dec. 20, 2018

Related U.S. Application Data

(63) Continuation of application No. 15/088,384, filed on Apr. 1, 2016, now Pat. No. 10,084,614, which is a
(Continued)

(51) Int. Cl.
*H04L 12/46* (2006.01)

(52) U.S. Cl.
CPC ........ *H04L 12/467* (2013.01); *H04L 12/4641* (2013.01)

(58) Field of Classification Search
CPC .................. H04L 12/4641; H04L 12/467
See application file for complete search history.

(56) References Cited

U.S. PATENT DOCUMENTS 6,067,296 A    5/2000 Heering et al.
6,160,806 A    12/2000 Cantwell et al.
(Continued)

FOREIGN PATENT DOCUMENTS

JP    2015-175528 A    6/2005
KR    2002-0006784 A    1/2002

OTHER PUBLICATIONS

Chandramani et al., "Design of a Multigigabit Optical Network Interface Card." IEEE Journal of Selected Topics in Quantum Electronics, vol. 9, No. 2, Mar./Apr. 2003, pp. 636-646.
(Continued)

*Primary Examiner* — Ahmed Elallam
(74) *Attorney, Agent, or Firm* — Amin, Turocy & Watson, LLP

(57) ABSTRACT

To reduce performance losses and costs associated with serializing parallel communications when communicating with other computing devices over a local area network ("LAN") or a wide area network ("WAN"), bus virtualization is provided to maintain parallelization for inter machine communications over a network. Control lines and data lines associated with a parallel bus communication can be received by a network adapter, and instead of serializing the communications, the network adapter can map each of the control and data lines to respective virtual local area networks ("VLAN"). Multiple VLANs can exist together on a LAN or WAN while logically segmented, allowing the respective VLANs to facilitate communications for the control and data lines over the network.

20 Claims, 9 Drawing Sheets

Related U.S. Application Data continuation of application No. 14/054,339, filed on Oct. 15, 2013, now Pat. No. 9,331,868.

(56) References Cited

U.S. PATENT DOCUMENTS

| | | | |
|---|---|---|---|
| 7,447,795 B2 | 11/2008 | Naghshineh et al. | |
| 7,519,076 B2 | 4/2009 | Janssen et al. | |
| 7,580,417 B2 | 8/2009 | Ervin et al. | |
| 8,406,230 B2 | 3/2013 | Lu et al. | |
| 9,246,702 B1 | 1/2016 | Sharma et al. | |
| 9,323,708 B2 * | 4/2016 | Sharma | G06F 13/4063 |
| 9,331,868 B2 | 5/2016 | Gardner | |
| 9,363,207 B2 | 6/2016 | Mittal et al. | |
| 2002/0174307 A1 | 11/2002 | Yoshida et al. | |
| 2004/0111536 A1 | 6/2004 | Ellerbrock et al. | |
| 2006/0067335 A1 | 3/2006 | Maya et al. | |
| 2009/0063889 A1 | 3/2009 | Dada et al. | |
| 2010/0014448 A1 | 1/2010 | Wentink et al. | |
| 2010/0171882 A1 | 7/2010 | Cho et al. | |
| 2012/0063353 A1 | 3/2012 | Schlenk et al. | |
| 2012/0185614 A1 | 7/2012 | Reed | |
| 2012/0250704 A1 | 10/2012 | Yamada et al. | |
| 2012/0294192 A1 | 11/2012 | Masood et al. | |
| 2012/0331142 A1 | 12/2012 | Mittal et al. | |
| 2013/0044751 A1 | 2/2013 | Casado et al. | |
| 2013/0044752 A1 | 2/2013 | Koponen et al. | |
| 2014/0201309 A1 | 7/2014 | Dalal et al. | |

OTHER PUBLICATIONS

Gui et al., "Gigabit Optical Network Interface Card using Parallel Data Fiber Link for a Free-Space Switched Local Area Network System." The 14th Annual Meeting of the IEEE Lasers and Electro-Optics Society, Nov. 12-13, 2001, pp. 863-864.

Takahashi et al., "Achieving Large Bandwidth by Leveraging Parallelism in End-Hosts and Networks." Proceedings of the IEEE Photonics Society Summer Topicals 2009 Conference, Jul. 20-22, 2009, 2 pages.

Non-Final Office Action for U.S. Appl. No. 14/054,339 dated Aug. 11, 2015, 31 pages.

Notice of Allowance for U.S. Appl. No. 14/054,339 dated Jan. 4, 2016, 30 pages.

Non-Final Office Action for U.S. Appl. No. 15/088,384 dated Nov. 1, 2017, 20 pages.

* cited by examiner

METHOD OF BUS VIRTUALIZATION IN COMPUTING MACHINE INTERCOMMUNICATIONS

CROSS-REFERENCE TO RELATED APPLICATION

This patent application is a continuation of, and claims priority to each of, U.S. patent application Ser. No. 15/088,384 (now U.S. Patent No. 10,084,614), filed on Apr. 1, 2016, and entitled "METHOD OF BUS VIRTUALIZATION IN COMPUTING MACHINE INTERCOMMUNICATIONS", which is a continuation of U.S. patent application Ser. No. 14/054,339 (now U.S. Patent No. 9,331,868), filed on Oct. 15, 2013, and entitled "METHOD OF BUS VIRTUALIZATION IN COMPUTING MACHINE INTERCOMMUNICATIONS". The entireties of the foregoing applications are hereby incorporated by reference herein.

TECHNICAL FIELD

The subject disclosure relates to maintaining parallel communications in computing machine intercommunications using bus virtualization over virtual local area networks.

BACKGROUND

A conventional network interface receives parallel signals over a bus. The network interface maps these parallel signals into a serial pattern for transport (both local area network and wide area network. Once serialized, these signals are generally mapped into some sort of protocol for more efficient transport. The serialization/mapping and then demapping/serial to parallel conversion at the receiving end adds to transmission overhead, affecting both transport performance and the economics of the transport.

DETAILED DESCRIPTION

Figure 1:
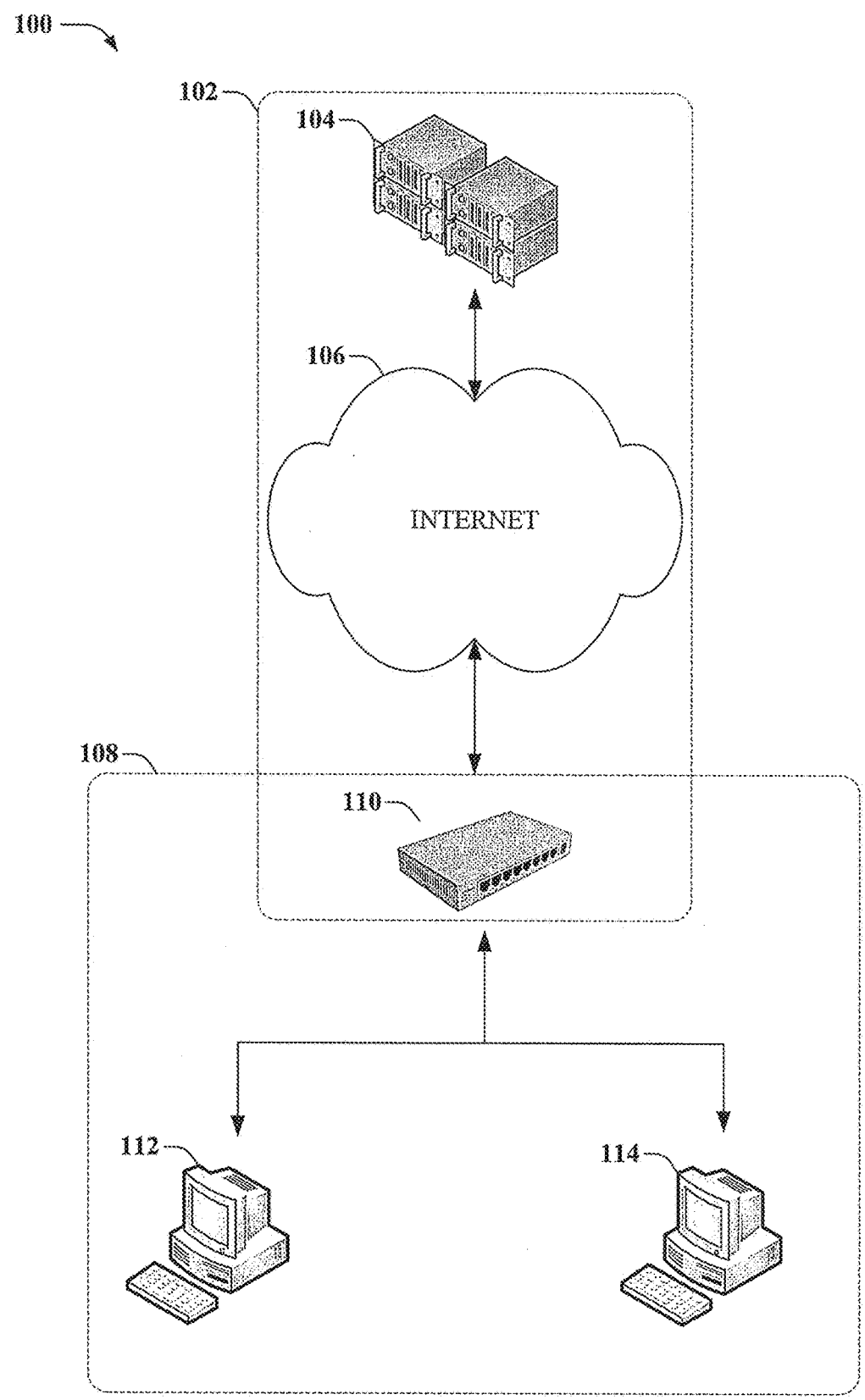
FIG. 1 is a block diagram illustrating an example, non-limiting embodiment of a local area network and wide area network using bus virtualization for communication in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

To reduce performance losses and costs associated with serializing parallel communications when communicating with other computing devices over a local area network ("LAN") or a wide area network ("WAN"), a system for bus virtualization is provided for maintaining parallelization for inter machine communications over a network. Control lines and data lines associated with a parallel bus communication can be received by a network adapter, and instead of serializing the communications, the network adapter can map each of the control and data lines to respective virtual local area networks ("VLAN"). Multiple VLANs can exist together on a LAN or WAN while logically segmented, allowing the respective VLANs to facilitate communications for the control and data lines over the network. A computing device can receive the signals sent via the VLANs and map the VLANs to control and data lines and deliver the signals to the receiving computing device's bus. In this way, a parallel bus can be virtually extended over a network between computing devices, and the performance and economic costs of serializing communications is avoided.

For these considerations as well as other considerations, in one or more embodiments, a system includes a memory to store executable instructions and a processor, coupled to the memory to facilitate execution of the executable instructions to perform operations including receiving a transmission from a bus connection, wherein the bus connection comprises a control line and a data line. The operations further comprise mapping the control line and the data line to a set of respective virtual local area networks that are logically segmented from each other. The operations also comprise transmitting an outgoing transmission to broadcast domains associated with the set of respective virtual local area networks via a transmission line, wherein the outgoing transmission is based on the transmission.

In another embodiment, a method includes receiving, by a device comprising a processor, a first transmission from a bus connection, wherein the bus connection comprises a first control line and a first data line. The method further includes assigning the first control line and the first data line to a first set of virtual local area networks that are logically segmented from one another and transmitting an outgoing transmission to broadcast domains associated with the first set of virtual local area networks via a transmission line, where the outgoing transmission is based on the first transmission.

In another embodiment, a network interface comprises a memory to store executable instructions; and a processor, coupled to the memory, to facilitate execution of the executable instructions to perform operations. The operations include receiving a transmission from a bus connection, wherein the bus connection comprises a control line a data line. The operations further comprise assigning the control line and the data line to respective virtual local area networks, wherein the respective virtual local area networks are logically segmented from each other. The operations further comprise initiating transmission of an outgoing transmission via the respective virtual local area networks, wherein the outgoing transmission is based on the first transmission.

Turning now to FIG. 1, illustrated is an example, non-limiting embodiment of a computer network environment 100 showing a local area network and wide area network using bus virtualization in accordance with various aspects described herein. A WAN 102 and a LAN 108 can be utilized to facilitate parallel communications between computing devices 104, 112, and 114, and a router 110 can be provided to facilitate communications between the WAN 102 and the LAN 108. VLANs set up between computing device 104, 112, and 114 can be used to communicate signals corresponding to the control and data lines of bus communications between computing devices 104, 112, and 114. Transmitting the control and data lines between computing devices 104, 112, and 114 using the VLANs to virtualize bus communications allows the computing devices to communicate with each other without the performance and economic costs of serializing the parallel signals.

In an embodiment, computing device 104 can be a server or other computer in a data center or remote location and provide storage or services (e.g., Software as a Service) for computing devices 112 and/or 114 via the Internet 106. Instead of communicating via network adapters that serialize the communication stream for transport between the computing devices, the network adapters virtualize the buses using VLANs, where each control and data line is mapped to a VLAN. The logically segmented VLANs allow signals over the control and data lines to be sent in parallel, without needing to serialize the transport streams.

In an embodiment, WAN 102 can be a distributed computer network with components distributed over a wide area. The components, of which computing device 104 can be one, can communicate with each other using parallel bus communications, and network interfaces associated with the computing device 104 and other components can virtualize the bus communications over the WAN 102.

In another embodiment LAN 108 can be any local network with one or more computing devices (e.g., computing devices 112 and 114) interconnected via one or more routers (e.g., router 110). In an embodiment, LAN 108 can comprise all or a portion of a data center. Computing devices 112 and 114 can be separate computing devices or be portions or components of a distributed computing network.

It is to be appreciated that while FIG. 1 shows WAN 102 with one computing device 104 and LAN 108 with two computing devices 112 and 114 interconnected by router 110, in other embodiments, other combinations and numbers of computing devices and routers are possible. For example, LAN 108 can comprise 100 or more computing devices and WAN 102 can include multiple computing devices as well.

Figure 2:
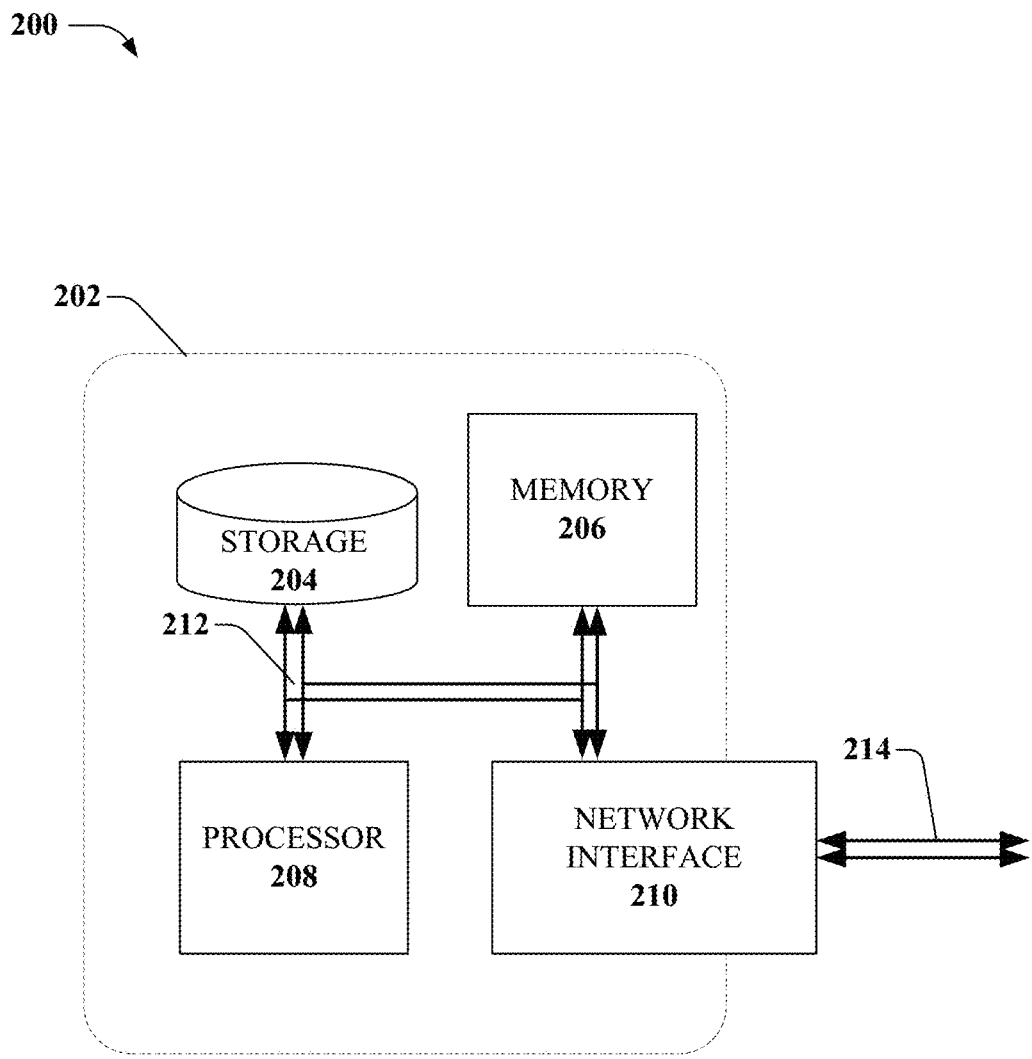
FIG. 2 is a block diagram illustrating an example, non-limiting embodiment of a computing device that maintains parallel communications when transmitting data to another computing device in accordance with various aspects described herein.

Turning now to FIG. 2, a block diagram illustrating an example, non-limiting embodiment of a computing device that maintains parallel communications when transmitting data to another computing device is shown. System 200 includes a computing device 202 that communicates with other computing devices using virtualized bus connections. Computing device 202 can include a storage component 204, a memory component 206, a processor component 208 and a network interface component 210.

The components 204, 206, 208, and 210 can communicate with each other via parallel bus 212. Network interface 210 can receive the bus communications and then map control and data lines from the bus communications to individual VLANs 214 and transport the control and data lines via the VLANs 214 to computing devices connected to the computing device 202 via a LAN or a WAN. The other computing devices can have their own network interfaces which remap the VLANs 214 to control and data lines, and deliver the communications to other components in the computer devices. In this way, components in computing device 202 can communicate with components in other computing devices via parallel bus 212 and VLANs 214 that synthesize a bus, without having to serialize the communications for long distance transport.

In an embodiment, a medium for the long distance transport can be an Ethernet cable. In other embodiments, network interface 210 can transmit the parallel bus communications via the VLANs 214 over optical cables, coaxial cables, or other mediums suitable for connecting computing devices (e.g., computing device 202). Accordingly, in some embodiments, network interface 210 can wirelessly transmit the communications to other computing devices via Wi-Fi (802.11/b/g/n/ac . . . , etc.), WiMAX (802.16), and other wireless communications protocols. The VLANs 214 can be mapped into Ethernet/Internet Protocol streams for local area network connections and can be mapped into higher level protocols (multiprotocol layer switching or "MPLS" for layer 3, higher speed Ethernet for layer 2, or an optical container (ODUFLEX) for layer 1, and etc.) for wide area network connections.

In an embodiment, when the VLANS 214 comprise a plurality of cables or transport mediums, in order to minimize transport latency and to keep the latency within close tolerances, the packet flows over the VLANS 214 can be containerized. MPLS for Ethernet cables, ODUFLEX for optical cables, and other types of container formats can be used to containerize the packet flows to a common route.

In an embodiment, instead of having the components of computing device 202 located locally, with other computing devices located remotely, the components of computing device 202 can be distributed remotely, and the network interface 210 can virtualize the bus communications between the components by mapping the control and data lines of the bus communications to separate VLANs. For instance, processor 208 and memory 206 can share a bus with network interface 210, while storage 204 is located elsewhere in a building, or at a distant data center. Network interface 210 can synthesize the bus (e.g., over VLANs 214) and the components 208, 206, and 204 can interact with each other natively using bus connections that have not been serialized for long distance transport.

Figure 3:
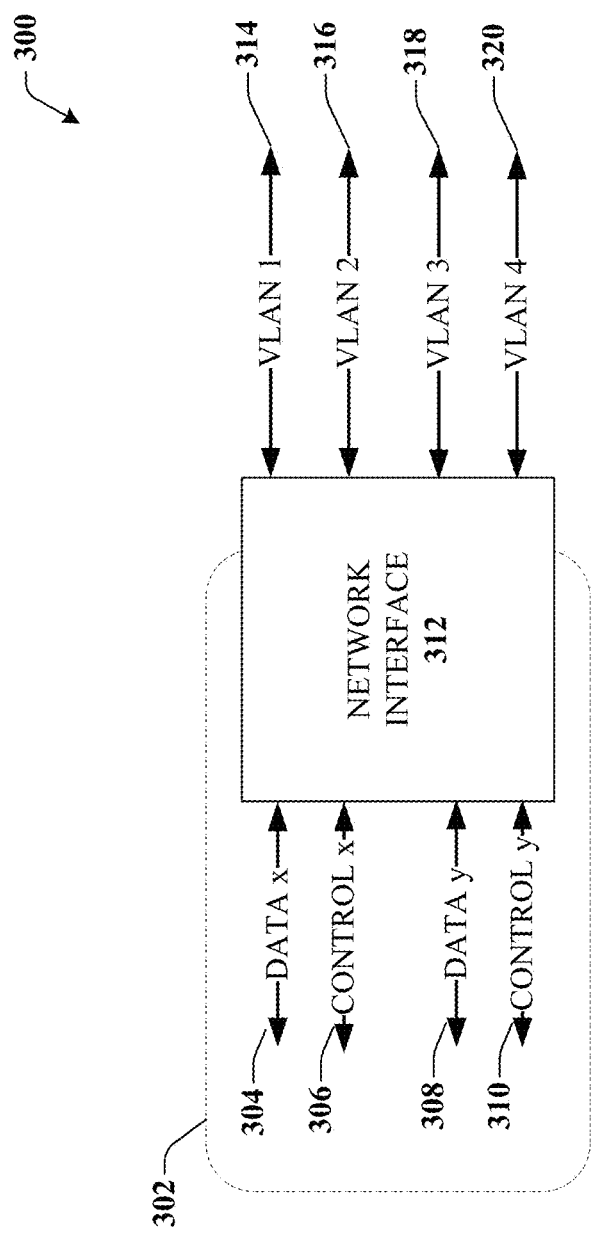
FIG. 3 is a block diagram illustrating an example, non-limiting embodiment of a system of bus virtualization in accordance with various aspects described herein.

Turning now to FIG. 3, illustrated is an example, non-limiting embodiment of a system of bus virtualization. System 300 shows a computing device 302 that includes a network interface 312 that maps data and control lines (e.g., 304, 306, 308, and 310) to VLANs 314, 316, 318, and 320 for long distance transport.

Network interface 312 can receive communications sent over a bus from components in the computing device 302 (e.g., storage 204, memory 206, and processor 208). The bus can contain a plurality of data and control lines 304, 306, 308, and 310. Data lines can input and output data whereas control lines can provide clock signals, error correction codes and commands from the processor 208 and returns status signals from the devices, for example if the data is being read or written to the device the appropriate line (read or write) will be active (logic zero). In the embodiment shown in FIG. 3, there are two data lines, Data x 304 and Data y 308, and two control lines Control x 306 and Control y 310. It is to be appreciated however that, in other embodiments, other combinations and numbers of control and data lines are possible.

Network interface 312 is communicably coupled to the data and control lines 304-310, and when signals are received via the data and control lines 304-310, network interface 312 identifies the control and data lines that are active, and maps those lines to one or more of VLANs 314, 316, 318, and 320. VLANs 314-320 can be preexisting, already created, with a number of VLANs corresponding to a number of control and data lines received by network interface 312. In other embodiments, network interface 312 can be configured to create VLANs dynamically as required.

In an embodiment, once network interface 312 has mapped the control and data lines 304-310 to VLANs 314-320, network interface 312 can retransmit the signals received via the bus connection over the transport medium via the VLANs 314-320. The transport medium can include one or more Ethernet cables, optical cable, coax, or wireless transmissions. In an embodiment, provided the bandwidth of the bus communications is under a predetermined bandwidth, the VLANs 314-320 can be logically segmented over a single Ethernet cable. If the bandwidth of the bus communication is over the predetermined amount (corresponding to the bandwidth of the transport medium), the VLANs can be assigned to more than one Ethernet cable (or other transport medium).

Figure 4:
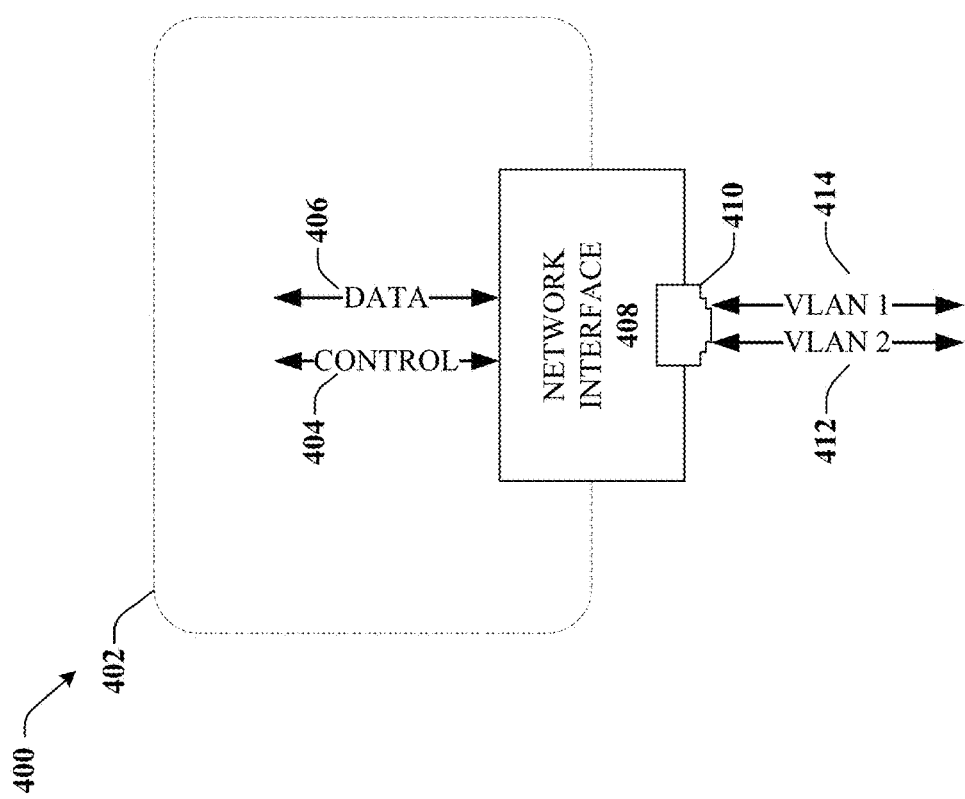
FIG. 4 is a block diagram illustrating an example, non-limiting embodiment of a system of bus virtualization in accordance with various aspects described herein.

Turning now to FIG. 4, illustrated is an example, non-limiting embodiment of a system of bus virtualization. System 400 shows a computing device 402 that includes a network interface 408 that maps control and data lines 404 and 406 to VLANs 412 and 414 for long distance transport.

Network interface 408 can receive communications sent over a bus from components in the computing device 402 (e.g., storage 204, memory 206, and processor 208). The bus can contain at least one each of control and data lines 404 and 406. Data lines can input and output data whereas control lines can provide clock signals, error correction codes and commands from the processor 208 and returns status signals from the devices, for example if the data is being read or written to the device the appropriate line (read or write) will be active (logic zero). In the embodiment shown in FIG. 4, there is one control line 404 and one data line 406. It is to be appreciated however that, in other embodiments, other combinations and numbers of control and data lines are possible.

Network interface 408 is communicably coupled to the control and data lines 404 and 406, and when signals are received via the control and data lines 404 and 406, network interface 408 maps those lines to VLANs 412 and 414. In the embodiment shown in FIG. 4, the amount of data to be transported over VLANs 412 and 414 is below a capacity of a single transport medium (e.g., Ethernet cable), and so network interface 408 assigns the VLANs 412 and 414 to a single Ethernet cable (or other transport medium) which is connected via port 410.

Figure 5:
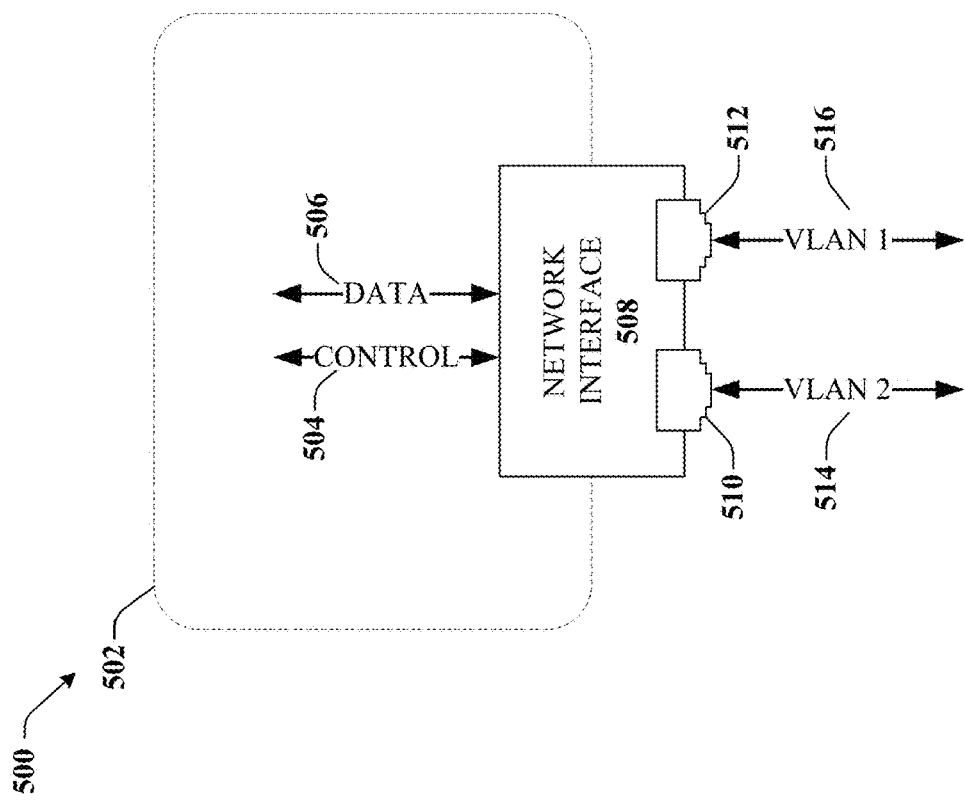
FIG. 5 is a block diagram illustrating an example, non-limiting embodiment of a system of bus virtualization in accordance with various aspects described herein.

Turning now to FIG. 5, illustrated is an example, non-limiting embodiment of a system of bus virtualization. System 500 shows a computing device 502 that includes a network interface 508 that maps control and data lines 504 and 506 to VLANs 514 and 516 for long distance transport. In the embodiment shown in FIG. 5, the amount of data to be transported over VLANs 514 and 516 is over a capacity of a single transport medium (e.g., Ethernet cable), and so network interface 508 assigns the VLANs 514 and 516 to two Ethernet cables (or other transport medium) which are connected via ports 510 and 512.

Figure 6:
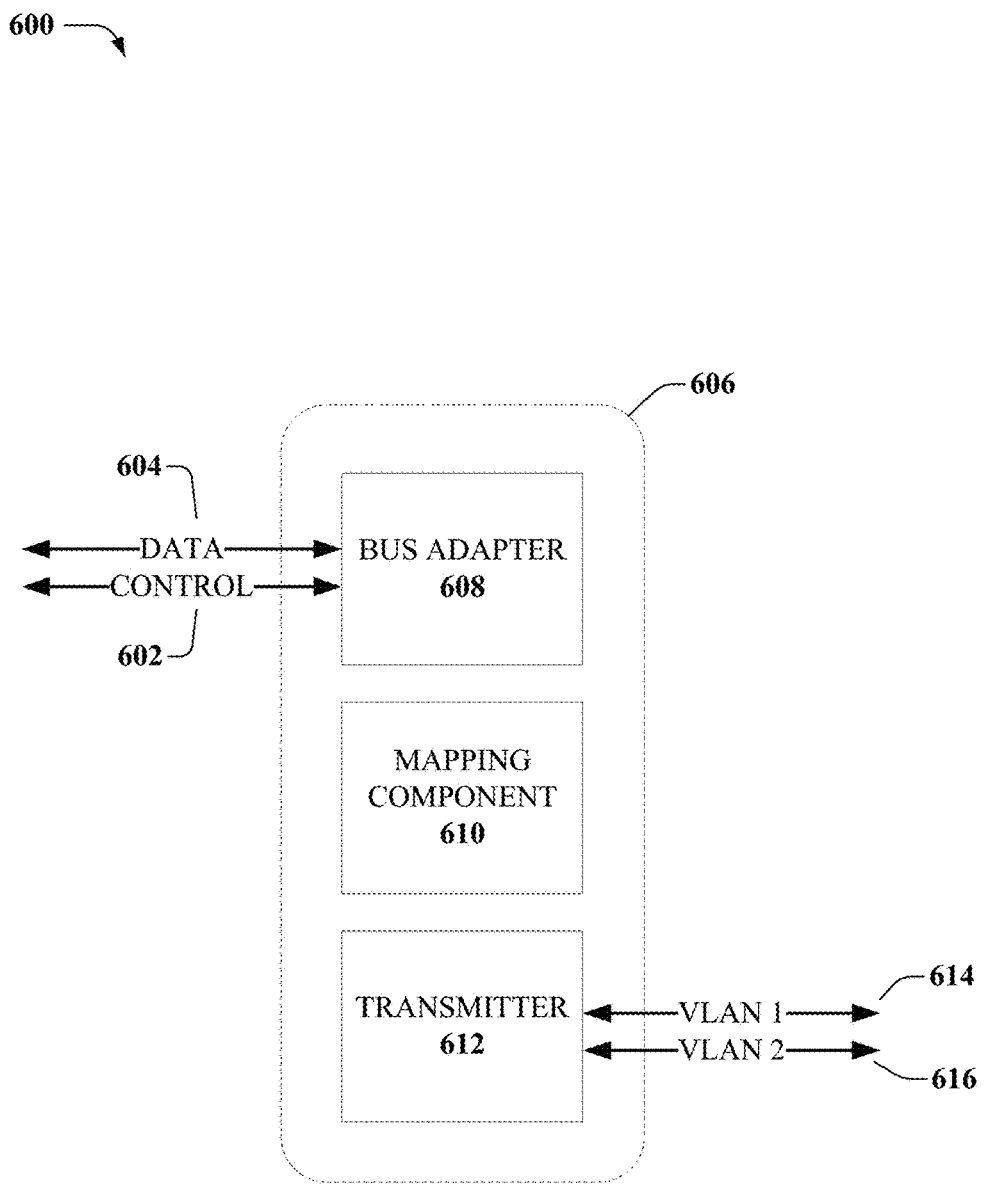
FIG. 6 is a block diagram illustrating an example, non-limiting embodiment of a system of bus virtualization in accordance with various aspects described herein.

FIG. 6 is a block diagram illustrating an example, non-limiting embodiment of a system 600 of bus virtualization in accordance with various aspects described herein. System 600 shows a network interface 606 that receives bus communications via control and data lines 602 and 604 and then maps the control and data lines to VLANs 614 and 616 for long distance transport.

Network interface 606 can include a bus adapter 608 that is configured to receive a first transmission from a bus connection where the bus connection comprises a control line 602 and a data line 604. It is to be appreciated that while the bus connection shown in FIG. 6 shows one data and control line each, in other embodiments there can be multiple data and control lines that interface with bus adapter 608.

Mapping component 610 can be provided to assign the control line 602 and the data line 604 to respective VLANs 614 and 616, wherein the respective VLANs 614 and 616 are logically segmented from each other. The VLANs 614 and 616 can be on separate transport media (e.g., two or more Ethernet cables, optical cables, etc.) or can logically segmented into separate broadcast domains on the same wire.

A transmitter 612 transmits an outgoing transmission over the VLANs 614 and 616 and the outgoing transmission is based on the transmission received at the bus adapter 608 via the bus connection. Transmitter 612 can determine the bandwidth of the transmission and determine whether the VLANs 614 and 616 should be assigned to a single transport cable. If the transmission bandwidth is higher than the capacity of the transport cable, the transmitter 612 can transmit the outgoing transmission over a plurality of transport cables (e.g., Ethernet cables). Each transport line is therefore assigned to be associated with one or more of the VLANs 614 and/or 616.

In an embodiment, the mapping component 610 can also generate metadata to accompany transmissions sent via VLANs 614 and 616. The metadata can identify which of the control and data lines 602 and 604 correspond to which of the VLANs 614 and 616. The metadata can be used by a receiving network interface to correctly map the VLANs back to respective control and data lines.

Figure 7:
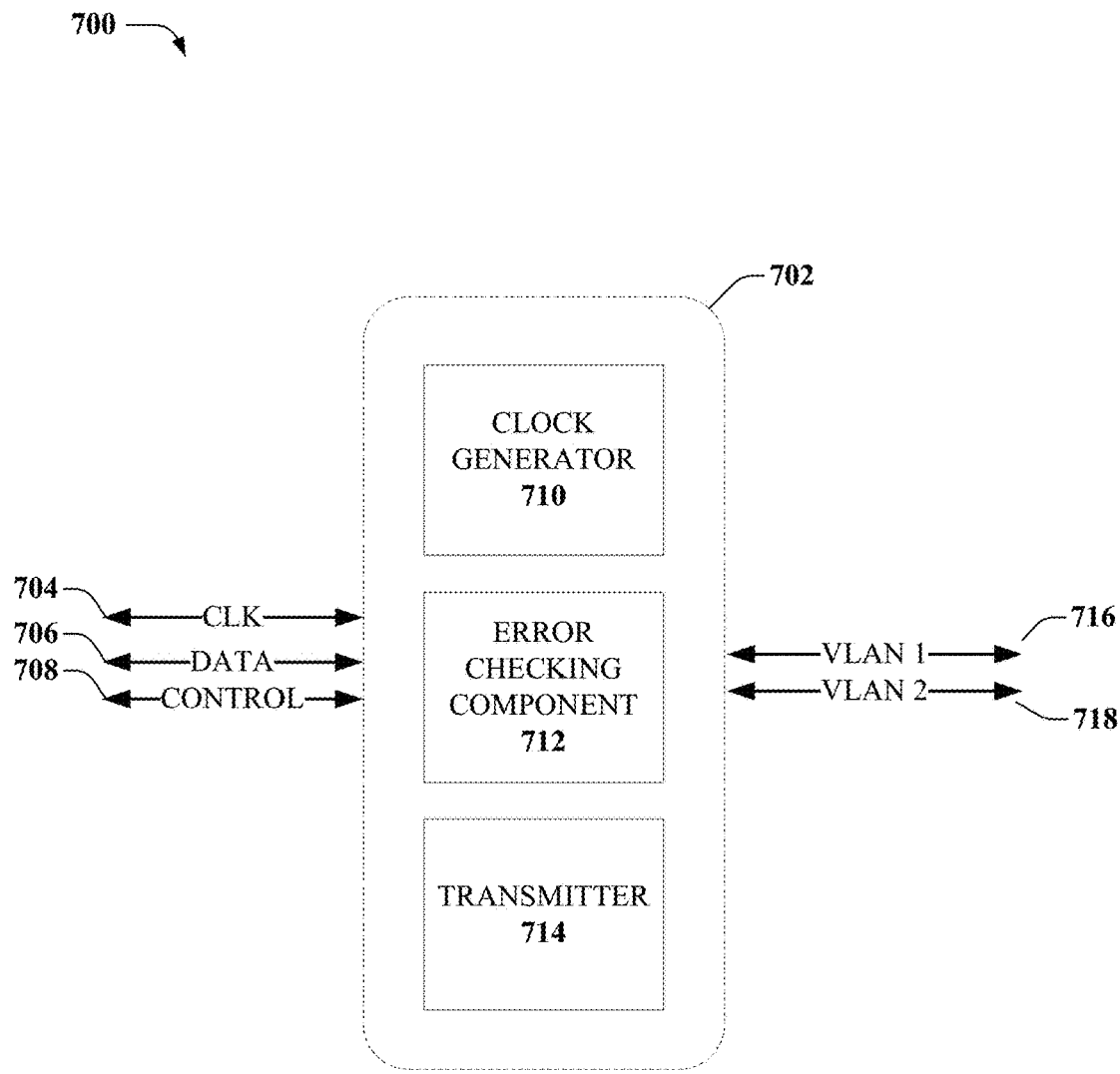
FIG. 7 is a block diagram illustrating an example, non-limiting embodiment of a system of bus virtualization in accordance with various aspects described herein.

Turning now to FIG. 7, illustrated is a block diagram of an example, non-limiting embodiment of a system of bus virtualization. System 700 shows a network interface 702 that receives bus communications via data and control lines 706 and 708 as well as CLK line 704 and then maps the CLK, control, and data lines to VLANs 716 and 718 for long distance transport.

Network interface 702 can include a bus adapter (e.g., bus adapter 608) that is configured to receive a first transmission from a bus connection where the bus connection comprises a control line 708, a data line 706, and a CLK line 704. It is to be appreciated that while the bus connection shown in FIG. 7 shows a separate CLK line, in other embodiments, the clock signal can be delivered by one or more of the control lines.

Clock generator 710 can generate a clock signal to be transmitted over the VLANs. Clock generator 710 can receive the clock signal received via CLK line 704 and synchronize the generated clock signal to the received clock signal. This generated clock signal can be mapped to one or more of the VLANs 716 or 718. In an embodiment, the transport clock signal can be assigned to a VLAN by itself, and in other embodiments, the transport clock signal can be assigned to a VLAN that is also transmitting one or more of the control line signals.

Error checking component 712 can be provided to generate a set of parity bits to be sent with the outgoing transmission, wherein the set of parity bits is based on a function of a size of the outgoing transmission. A parity bit is a bit added to the end of a string of code that indicates whether the number of bits in the string is even or odd. The parity bits thus function as a simple and efficient form of error connection. A parity bit can be added to each of the signals sent per VLAN, where the parity bit indicates whether the number of bits transmitted per VLAN is even or odd. Once the clock signals and the parity bits are generated, transmitter 714 can transmit the outgoing transmission with the clock signal and parity bits attached, over the VLANs 716 and 718.

An error checking component on a receiving computer device can then check the number of bits received per VLAN, and if there is a mismatch, the error checking component can determine that there was a loss of data between the computing devices.

Figure 8:
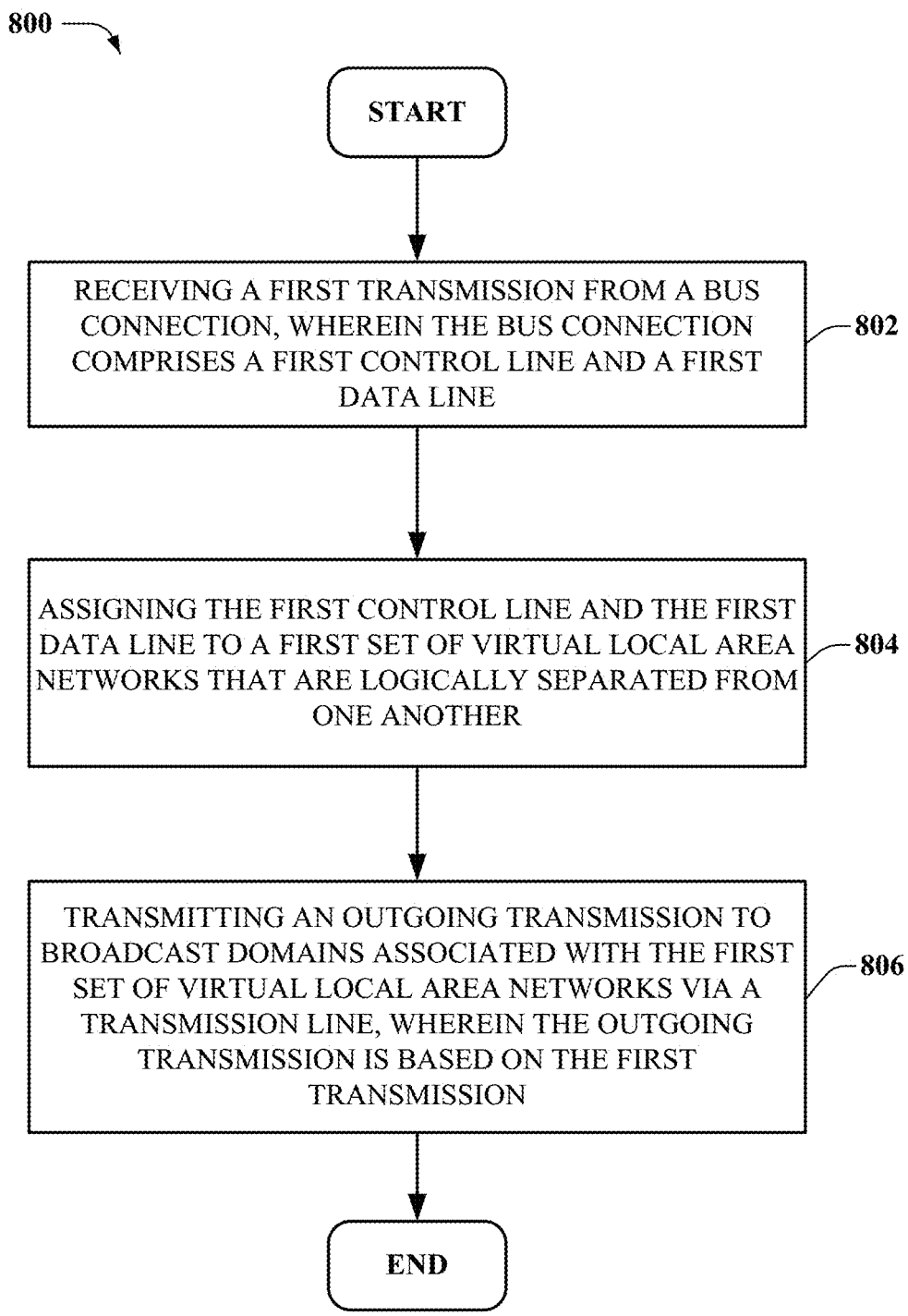
FIG. 8 illustrates a flow diagram of an example, non-limiting embodiment of a method for bus virtualization as described herein.

FIG. 8 illustrates a process in connection with the aforementioned systems. The process in FIG. 8 can be implemented for example by systems 100, 200, 300, 400, 500, 600, and 700 and illustrated in FIGS. 1-7 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates a flow diagram of an example, non-limiting embodiment of a method for virtualizing bus communications as described herein. Methodology 800 can begin at step 802, where a first transmission is received (e.g., by bus adapter 608) from a bus connection, wherein the bus connection comprises a first control line and a first data line. Data lines can input and output data whereas control lines can provide clock signals, error correction codes and commands from the processor and returns status signals from the devices, for example if the data is being read or written to the device the appropriate line (read or write) will be active (logic zero).

At step 804, the first control line and the first data line can be assigned (e.g., by mapping component 610) to a first set of virtual local area networks wherein the virtual local area networks are logically separated from each other. The VLANs can be preexisting, already created, with a number of VLANs corresponding to a number of control and data lines received by the network interface. Metadata can also be generated to identify the control lines and data lines that each of the VLANs correspond to. The metadata can be transmitted over the VLANs to assist receiving computing devices in de-mapping the VLANs.

At step 806, an outgoing transmission is transmitted (e.g., by transmitter 612) to broadcast domains associated with the first set of virtual local area networks via a transmission line, wherein the outgoing transmission is based on the first transmission received over the bus connection. The transmitter can determine the bandwidth of the transmission and determine whether the VLANs should be assigned to a single transport line. If the transmission bandwidth is higher than the capacity of the transport cable, the transmitter can transmit the outgoing transmission over a plurality of transport lines (e.g., Ethernet cables). Each transport line is therefore assigned to be associated with one or more of the VLANs.

Figure 9:
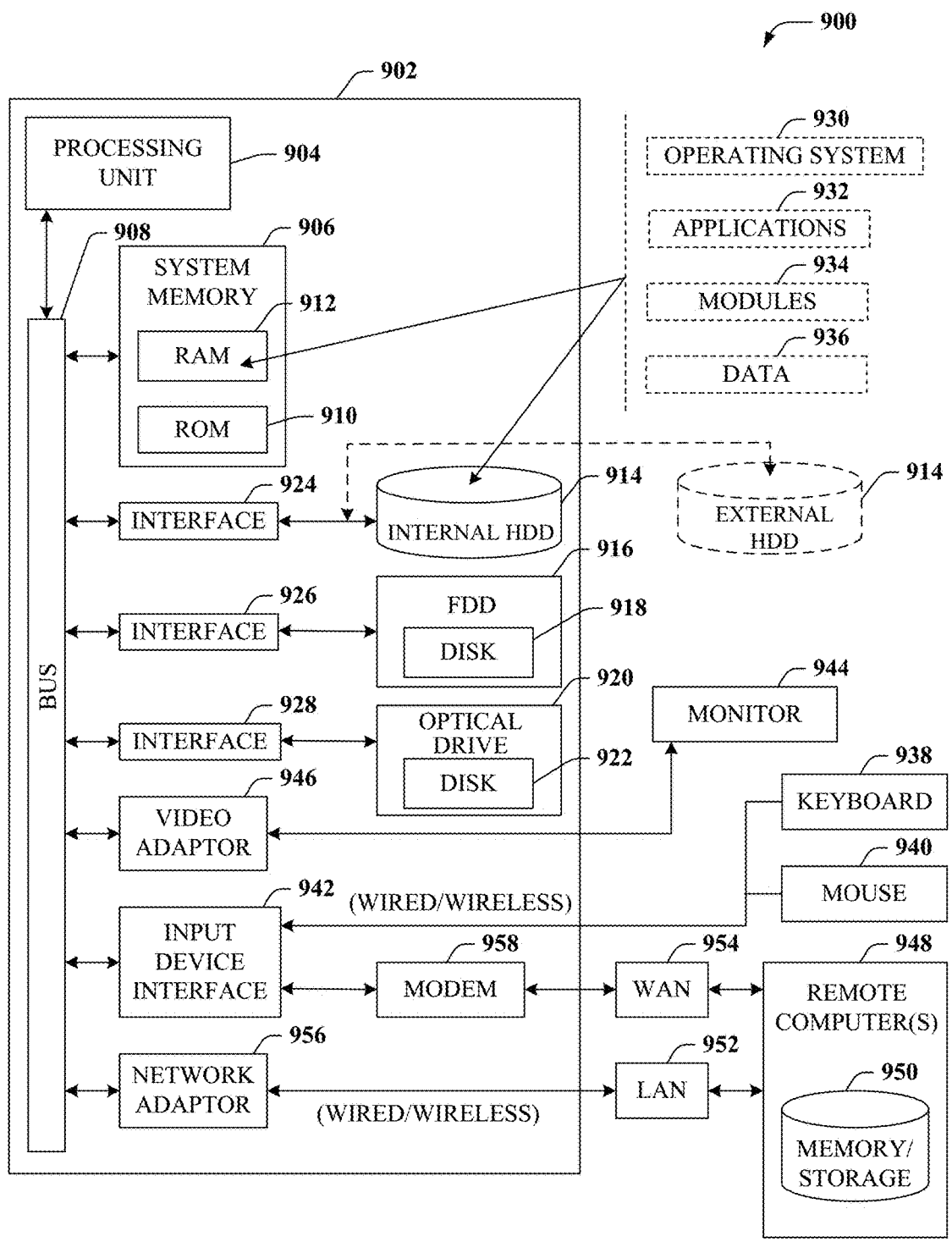
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the bus virtualization system disclosed in any of the previous systems 100, 200, 300, 400, 500, 600 and/or 700.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless AP disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 BaseT wired Ethernet networks used in many offices.

Figure 10:
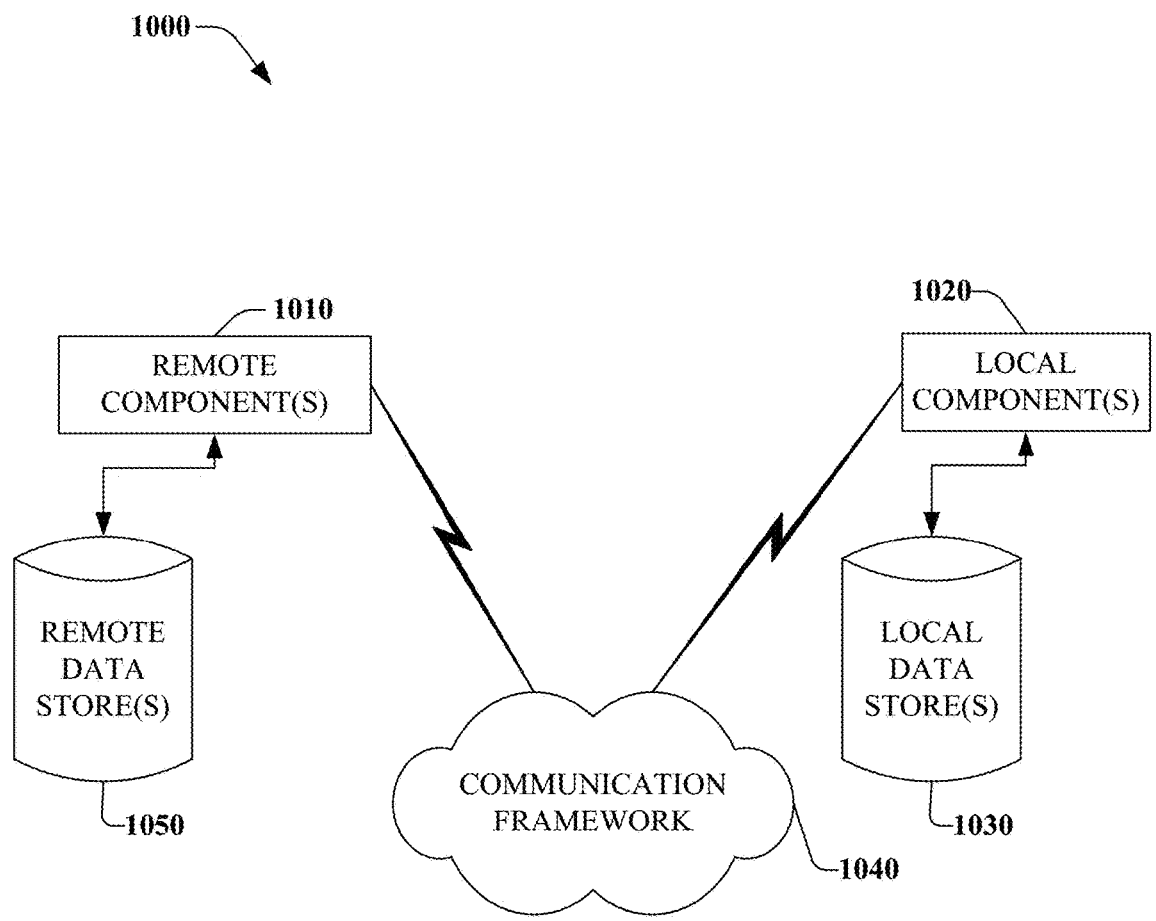
FIG. 10 is a block diagram of an example, non-limiting embodiment of a computer networking environment in accordance with various aspects described herein.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

FIG. 10 is a schematic block diagram of a computing environment 1000 with which the disclosed subject matter can interact. The system 1000 includes one or more remote component(s) 1010. The remote component(s) 1010 can be hardware and/or software (e.g., threads, processes, computing devices). In some embodiments, remote component(s) 1010 can include servers, governmental agency computers, etc. As an example, remote component(s) 1010 can be a police agency computer, a paid parking company computer, etc.

The system 1000 also includes one or more local component(s) 1020. The local component(s) 1020 can be hardware and/or software (e.g., threads, processes, computing devices). In some embodiments, local component(s) 1020 can include computing devices 112, 114, 202, 302, 402, 502, 606, and 702 as well as storage 204, memory 206, processor 208, network interface 210, and components 608, 610, 612, 710, 712, and 714. As an example, local component(s) 1020 can be a content storage device of an ATM device. As another example, local component(s) 1020 can be a MDI comprising a smartphone.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. As an example, services information, focus state information, device environment information, proximity determination information, location information, etc., can be communicated over a packet-switched or circuit-switched channels between a parking enforcement query device, e.g., remote component 1010, and a smartphone device, e.g., a local component 1020, over an air interface, such as on a packet-switched or circuit-switched downlink channel. The system 1000 includes a communication framework 1040 that can be employed to facilitate communications between the remote component(s) 1010 and the local component(s) 1020, and can include an air interface, e.g., Uu interface of a UMTS network. Remote component(s) 1010 can be operably connected to one or more remote data store(s) 1050, such as a criteria set store, etc., that can be employed to store information, such as sets of criteria, on the remote component(s) 1010 side of communication framework 1040. Similarly, local component(s) 1020 can be operably connected to one or more local data store(s) 1030, such as content storage device 260, etc., that can be employed to store information, such as content for analysis, on the to the local component(s) 1020 side of communication framework 1040.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signalingstream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
mapping first data associated with a control line of a bus connection and second data associated with a data line of the bus connection to packets associated with virtual local area networks, wherein the virtual local area networks are logically segmented from each other, and wherein the control line and the data line are associated with the virtual local area networks; and
transmitting the first data and the second data via outgoing transmission lines associated with the virtual local area networks.

2. The system of claim 1, wherein the first data is received from the control line of the bus connection.

3. The system of claim 1, wherein the first data and the second data are received from a parallel bus communication.

4. The system of claim 1, wherein the control line is a first control line, wherein the data line is a first data line, and wherein the operations further comprise:
receiving a transmission from a second control line and a second data line via an optical cable.

5. The system of claim 4, wherein the virtual local area network is a first virtual local area network, and wherein the operations further comprise:
mapping the second control line and the second data line to a second virtual local area network of the virtual local area networks.

6. The system of claim 5, wherein the first virtual local area network and the second virtual local area network are associated with a single coaxial cable.

7. The system of claim 1, wherein the transmission lines are optical cables.

8. A method, comprising:
mapping, by a device comprising a processor, first data associated with a control line and second data associated with a data line as packets associated with a virtual local area network of virtual local area networks, wherein the virtual local area networks are logically segmented from one another resulting in segmented data, and wherein the control line and the data line are associated with the virtual local area network; and
facilitating, by the device, transmitting the segmented data to a broadcast domain associated with the virtual local area network, resulting in a transmission.

9. The method of claim 8, further comprising:
facilitating, by the device, receiving a clock signal from the control line.

10. The method of claim 9, wherein the clock signal is a first clock signal and further comprising:
synchronizing, by the device, a second clock signal with the first clock signal.

11. The method of claim 10, further comprising:
facilitating, by the device, transmitting the second clock signal with the segmented data in the transmission.

12. The method of claim 11, further comprising:
determining, by the device, a bandwidth consumed by the transmission.

13. The method of claim 12, wherein the transmission is a first transmission, and further comprising:
in response to the determining the bandwidth consumed by the first transmission, assigning, by the device, a transmission cable for a second transmission.

14. The method of claim 8, wherein the control line is a first control line, wherein the data line is a first data line, wherein the virtual local area network is a first virtual local area network, and wherein the method further comprises:
receiving, by the device, a transmission from a second control line and a second data line via an optical cable; and
mapping the second control line and the second data line to a second virtual local area network of the virtual local area networks.

15. The method of claim 14, wherein the first virtual local area network and the second virtual local area network are associated with a single coaxial cable.

16. A machine-readable storage medium, comprising executable instructions that, when executed by a processor, facilitate performance of operations, comprising:

mapping control line data associated with a control line and data line data associated with a data line from the control line and the data line, respectively, to virtual local area networks resulting in mapped control line data and mapped data line data, respectively, wherein the virtual local area networks are logically segmented from each other, and wherein the control line and the data line are associated with the virtual local area networks; and in response to the mapping, transmitting the mapped control line data and the mapped data line data to the virtual local area networks, resulting in a transmission.

17. The machine-readable storage medium of claim 16, wherein the operations further comprise:

receiving the transmission from a parallel bus connection.

18. The machine-readable storage medium of claim 17, wherein the parallel bus connection comprises the control line.

19. The machine-readable storage medium of claim 17, wherein the parallel bus connection comprises the data line.

20. The machine-readable storage medium of claim 16, wherein the transmitting the mapped control line data and the mapped data line data to the virtual local area is in response to an indication that a bandwidth associated with the transmission is greater than a capacity of a transmission cable of transmission cables.

\* \* \* \* \*